Figure 1:
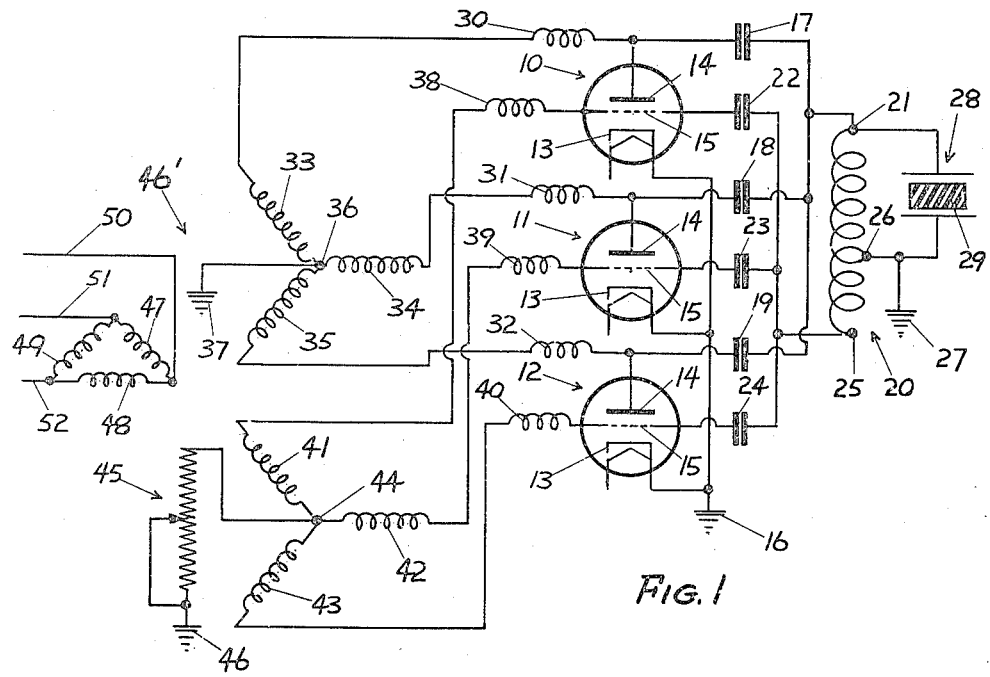

Sept. 6, 1949.                    M. A. LISSMAN                    2,481,132
                                FREQUENCY CONVERTER
                              Filed April 25, 1946

INVENTOR
MARCEL A. LISSMAN
BY
ATTY.

Patented Sept. 6, 1949

2,481,132

UNITED STATES PATENT OFFICE 2,481,132

FREQUENCY CONVERTER

Marcel A. Lissman, Cambridge, Mass., assignor to Raytheon Manufacturing Company, Newton, Mass., a corporation of Delaware Application April 25, 1946, Serial No. 664,775

3 Claims. (Cl. 250—36)

This invention relates to frequency converters and more particularly to aperiodic frequency converters especially suitable for transforming commercial power supply frequencies to higher frequencies.

While not limited thereto, the present invention is admirably adapted for generating, directly from the raw alternating current of commercial power lines, the high-frequency power utilized in induction or dielectric heating.

Apparatus of the type to which the present invention relates generally comprises a plurality of oscillatory circuits having a single frequency-determining network resonant to the frequency desired of the output of the device, said oscillatory circuits including electron-discharge devices which, when suitably energized, for example, from a multi-phase commercial power source, permit their respective oscillatory circuits successively to function, whereby said frequency-determining network is continuously excited at the aforesaid resonant frequency.

Existing systems of the character just described have been found to be inefficient and wasteful due to the method of commutating their electron-discharge devices, said commutating method being such that each electron-discharge device depends upon rectification in its own control electrode circuit to maintain itself biased substantially to cut-off during the time intervals each is intended to be inoperative. The control electrode current thus flowing depletes the power available in the output circuit, that is, in the frequency-determining network above referred to.

It is, therefore, one of the objects of the present invention generally to improve aperiodic frequency converters of the hereinbefore mentioned type.

It is another object of the present invention to provide a frequency converter which operates under conditions of efficiency, stability and regulation which are comparable to those of a self-biasing oscillator employing a direct-current power supply.

It is a further object of the present invention to provide a commutating method for a frequency converter operated from a multi-phase power supply which draws a minimum of control electrode current, thereby making greater power available in the output circuit thereof.

These, and other objects of the present invention, which will become more apparent as the detailed description thereof progresses, are attained, briefly, in the following manner:

The invention conventionally contemplates the provision of a plurality of oscillatory circuits having a single frequency-determining network in common, said frequency-determining network being resonant to the frequency desired of the output of the device. Each such oscillatory circuit includes an electron-discharge device for controlling the operation thereof. Energy is applied to said oscillatory circuits from a commercial multi-phase power source, the number of said oscillatory circuits corresponding to the number of phases of said power source. For the purposes of this specification, the invention will be described in connection with a 3-phase power supply.

The anode-cathode and control electrode circuits of said electron-discharge devices are successively energized, in phase, whereby the oscillatory circuit whose electron-discharge device instantaneously has the most positive potential applied to the anode thereof controls the high-frequency oscillations. As a result, said oscillatory circuits are successively brought into operation to cause the above referred to common frequency-determining network to be continuously excited. Inasmuch as each electron-discharge device conducts for only one-third of the time, greater heat dissipation is permissible, and greater output power is therefore obtainable. The oscillatory circuits are self-biasing, and a single means, common to all of said oscillatory circuits, is utilized to obtain said bias, thereby materially reducing the control electrode current which flows from that associated with commutating methods previously employed.

In the accompanying specification there shall be described, and in the annexed drawing shown, an illustrative embodiment of the frequency converter of the present invention. It is, however, to be clearly understood that the present invention is not to be limited to the details herein shown and described for purposes of illustration only, inasmuch as changes therein may be made without the exercise of invention, and within the true spirit and scope of the claims hereto appended.

Figure 2:
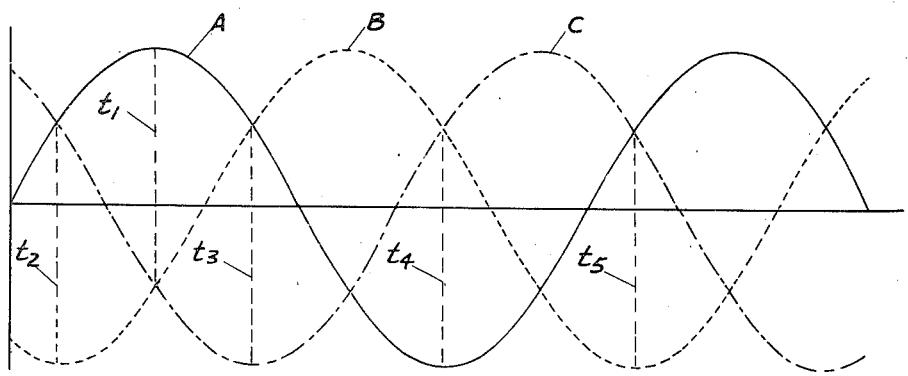

In said drawing,

Fig. 1 is a circuit diagram of an aperiodic frequency converter assembled in accordance with the principles of the present invention; and Fig. 2 shows the relationship of the voltages of the 3-phase power supply utilized in connection with the circuit of Fig. 1.

Referring now more in detail to the aforesaid illustrative embodiment of the present invention, with particular reference to Fig. 1 of the drawing, the numerals 10, 11 and 12 generally designate electron-discharge devices each of which includes a cathode 13, an anode 14, and a control electrode 15.

The cathodes 13 of the electron-discharge devices 10, 11 and 12 are all connected to ground, as at 16; the anodes 14 of said electron-discharge devices are connected, respectively, through capacitors 17, 18, and 19, to one end of an inductor 20, as at 21; and the control electrodes 15 of said electron-discharge devices are connected, respectively, through capacitors 22, 23, and 24, to the opposite end of said inductor 20, as at 25.

The inductor 20 is tapped, as at 26, and grounded, as at 27, whereby that portion thereof between said tap and the end 21 becomes the primary winding of a transformer, said primary winding being shunted by a capacitor 28 between the plates of which, when the device is to be utilized for dielectric heating, a load 29 may be placed. The values of the primary winding portion of the inductor 20, and the capacitor 29, are so chosen that said elements are resonant to the frequency desired of the output of the device, which may, for example, be 13 megacycles. The portion of the inductor 20 between the ends 21 and 25 thereof thus becomes the secondary of the above referred to transformer, by means of which the necessary energy feedback to sustain oscillation is obtained.

The anodes 14 of the electron-discharge devices 10, 11 and 12 are also connected, respectively, through radio-frequency chokes 30, 31 and 32, respectively, to windings 33, 34 and 35, the opposite ends of said windings being connected together, as at 36, and grounded, as at 37; and the control electrodes 15 of said electron-discharge devices are also connected, respectively, through radio-frequency chokes 38, 39 and 40, respectively, to windings 41, 42 and 43, the opposite ends of said last-named windings being connected together, as at 44, and grounded, through a potentiometer 45, as at 46.

The windings 33, 34 and 35, and the windings 41, 42 and 43 constitute secondary windings of a 3-phase power transformer 46', which also includes primary windings 47, 48 and 49 adapted to be connected to the lines 50, 51 and 52 of a 3-phase commercial power source.

There is thus presented an aperiodic frequency converter which is designed to operate from a multi-phase commercial power supply, and which comprises a plurality of oscillatory circuits having a single frequency-determining network in common, said oscillatory circuits being successively operable, as will now be described, to continuously excite said frequency-determining network at its resonant frequency.

In Fig. 2 of the drawing, there are shown three voltages, A, B and C, corresponding to the three phases, spaced 120° apart, of the commercial power lines 50, 51, and 52. The voltages induced in the secondary windings 33, 34 and 35 are in phase, respectively, with the voltages induced in the secondary windings 41, 42 and 43, but the former are intended to be of considerably greater magnitude than the latter. It will also be apparent that each of the voltages A, B and C is more positive than the other two for one-third of the time.

Now, the method of commutating the oscillatory circuits of the present invention is such that the electron-discharge device having the instantaneously most positive potential applied to its anode controls the high-frequency oscillations of the device, the conducting state of said last-named electron-discharge device adjusting the bias applied to each of the electron-discharge devices in a manner similar to conventional self-biasing oscillators having direct-current power supplies. In other words, as each electron-discharge device becomes conducting, such control electrode rectification occurs therein as to maintain the remaining electron-discharge devices in a non-conducting state, with such a negative potential on the control electrodes of said last-named electron-discharge devices that substantially no control electrode rectification can take place therein.

Consider the time $t_1$ indicated in Fig. 2 of the drawing, and assume the peak anode voltage across the winding 33 to be 5,000 volts and the peak radio-frequency drive on the control electrodes of all of the electron-discharge devices to be 500 volts. Further assume that with the above-mentioned radio-frequency drive applied to the control electrode of the electron-discharge device 10, and without the commutating voltage across the winding 41 being applied to said control electrode, the resistance value of the effective portion of the potentiometer 45 is such that, due to control electrode rectification in said electron-discharge device 10, there is a normal direct-current voltage drop across said effective portion of the potentiometer of 250 volts negative. This negative voltage appears across the capacitor 22 and is effectively in series opposition to the 500 volts radio-frequency drive between ground and the point 25 of the inductor 20. Under the foregoing conditions, when, in addition to the radio-frequency drive, the commutating voltage of 500 volts is applied to the control electrode of the electron-discharge device 10, said control electrode will have a positive excursion of 250 volts, and said last-named electron-discharge device will become conducting in phase with the power supply voltage A between the times $t_2$ and $t_3$, provided the effective portion of the potentiometer 45 is increased to obtain an additional 500 volt direct-current drop thereacross. The commutating voltage, as well as the above-mentioned drop across the potentiometer 45, appears across the capacitor 22 and, therefore, is effectively in series with said drop and the radio-frequency drive. This would tend to give the control electrode of the electron-discharge device 10 a positive excursion of 750 volts. However, by increasing the effective portion of the potentiometer 45, the above-mentioned negative drop of 250 volts is increased to 750 volts, compensating for the 500 volts commutating voltage excursion of the control electrode of the device 10 to 250 volts.

It will be noted that at the instant $t_1$, the common point 44 of one of the secondary sections of the transformer 46' will be depressed 750 volts below ground or cathode potential, while the voltages across secondary windings 42 and 43 will be 250 volts negative with respect to said common point 44. As a result, biasing voltages will be applied to the control electrodes of the electron-discharge devices 11 and 12 amounting to 1,000 volts negative with respect to ground. Hence, the latter two electron-discharge devices, when energized by the 500 volts radio-frequency drive, will still be biased 500 volts negative, more than enough to maintain them in a non-conducting state and prevent them from drawing control electrode current.

When the time $t_3$ is reached, commutation takes place, the electron-discharge device 11 takes over control of the circuit, and the devices 10 and 12 are maintained non-conducting. Finally, when the time $t_4$ is reached, commutation again takes place, and between said time $t_4$ and time $t_5$, the electron-discharge device 12 conducts, and maintains the devices 10 and 11 in a non-conducting state.

While particular voltage values have been assumed in the foregoing explanation, it is to be clearly understood that these values are merely illustrative, and the components of the device may be adjusted to obtain any other values which will result in commutation of the character described. It is to be further understood that while the electron-discharge devices have been shown herein as having their cathodes grounded, said devices may be inverted so as to have their anodes at ground potential. It is to be still further understood that while Hartley oscillators have been discussed herein, any other type of oscillator will function just as well.

This completes the description of the aforesaid illustrative embodiment of the present invention. It will be noted from all of the foregoing that the present invention provides a simple and efficient device for converting commercial power frequencies to higher frequencies. It will further be noted that the device operates under conditions of efficiency, stability and regulation comparable to those of a conventional self-biasing oscillator having a direct-current power supply. It will be still further noted that control electrode rectification in the oscillation-controlling electron-discharge device alone controls the biasing of the remaining electron-discharge devices.

Other objects and advantages of the present invention will readily occur to those skilled in the art to which the same relates.

What is claimed is:

1. An aperiodic frequency converter comprising: a plurality of oscillatory circuits having a single frequency-determining network in common, said frequency-determining network being resonant to the frequency desired of the output of said converter; each of said oscillatory circuits including an electron-discharge device having a cathode, an anode, and a control electrode; means, coupled to a multiphase power supply of a frequency different than that desired of the output of said converter, for successively applying alternating voltages to the anode-cathode circuits of said electron-discharge devices; means, independent of said last-named means and also coupled to said power supply, for successively applying alternating voltages to the control electrode circuits of said electron-discharge devices; the voltages so applied to said electron-discharge devices rendering the same successively conducting; and means, common to all of said electron-discharge devices and connected in series with said last-named means and the control electrodes of said electron-discharge devices for so biasing said electron-discharge devices that as each becomes conducting the remaining ones are maintained non-conducting.

2. An aperiodic frequency converter comprising: a plurality of oscillatory circuits having a single frequency-determining network in common, said frequency-determining network being resonant to the frequency desired of the output of said converter; each of said oscillatory circuits including an electron-discharge device having a cathode, an anode, and a control electrode; means, coupled to a multiphase power supply of a frequency different than that desired of the output of said converter, for successively applying alternating voltages to the anode-cathode circuits of said electron-discharge devices; means, independent of said last-named means and also coupled to said power supply, for successively applying alternating voltages to the control electrode circuits of said electron-discharge devices; the voltages so applied to said electron-discharge devices rendering the same successively conducting; and means, connected in parallel with the control electrode circuits of all of said electron-discharge devices, and in series with said last-named means, and the control electrodes of said electron-discharge devices whereby as each electron-discharge device becomes, in turn, conducting and control electrode rectification of a portion of its space current occurs, a biasing voltage is developed such as to maintain the remaining electron-discharge devices non-conducting.

3. An aperiodic frequency converter comprising: a plurality of oscillatory circuits having a single frequency-determining network in common, said frequency-determining network being resonant to the frequency desired of the output of said converter; each of said oscillatory circuits including an electron-discharge device having a cathode, an anode, and a control electrode; means, coupled to a multi-phase power supply of a frequency different than that desired of the output of said converter, for successively applying alternating voltages to the anode-cathode circuits of said electron-discharge devices; means, independent of said last-named means and also coupled to said power supply, for successively applying alternating voltages to the control electrode circuits of said electron-discharge devices; the voltages so applied to said electron-discharge devices rendering the same successively conducting; and a resistor, connected in parallel with the control electrode circuits of all of said electron-discharge devices, and in series with said last-named means and the control electrodes of said electron-discharge devices, whereby as each electron-discharge device becomes, in turn, conducting and control electrode rectification of a portion of its space current occurs, a biasing voltage is developed such as to maintain the remaining electron-discharge devices non-conducting.

MARCEL A. LISSMAN.

REFERENCES CITED

The following references are of record in the file of this patent:

UNITED STATES PATENTS

| Number | Name | Date |
| --- | --- | --- |
| 1,505,234 | Akers | Aug. 19, 1924 |
| 2,288,362 | McArthur | June 30, 1942 |
| 2,319,072 | McArthur | May 11, 1943 |